United States Patent Office.

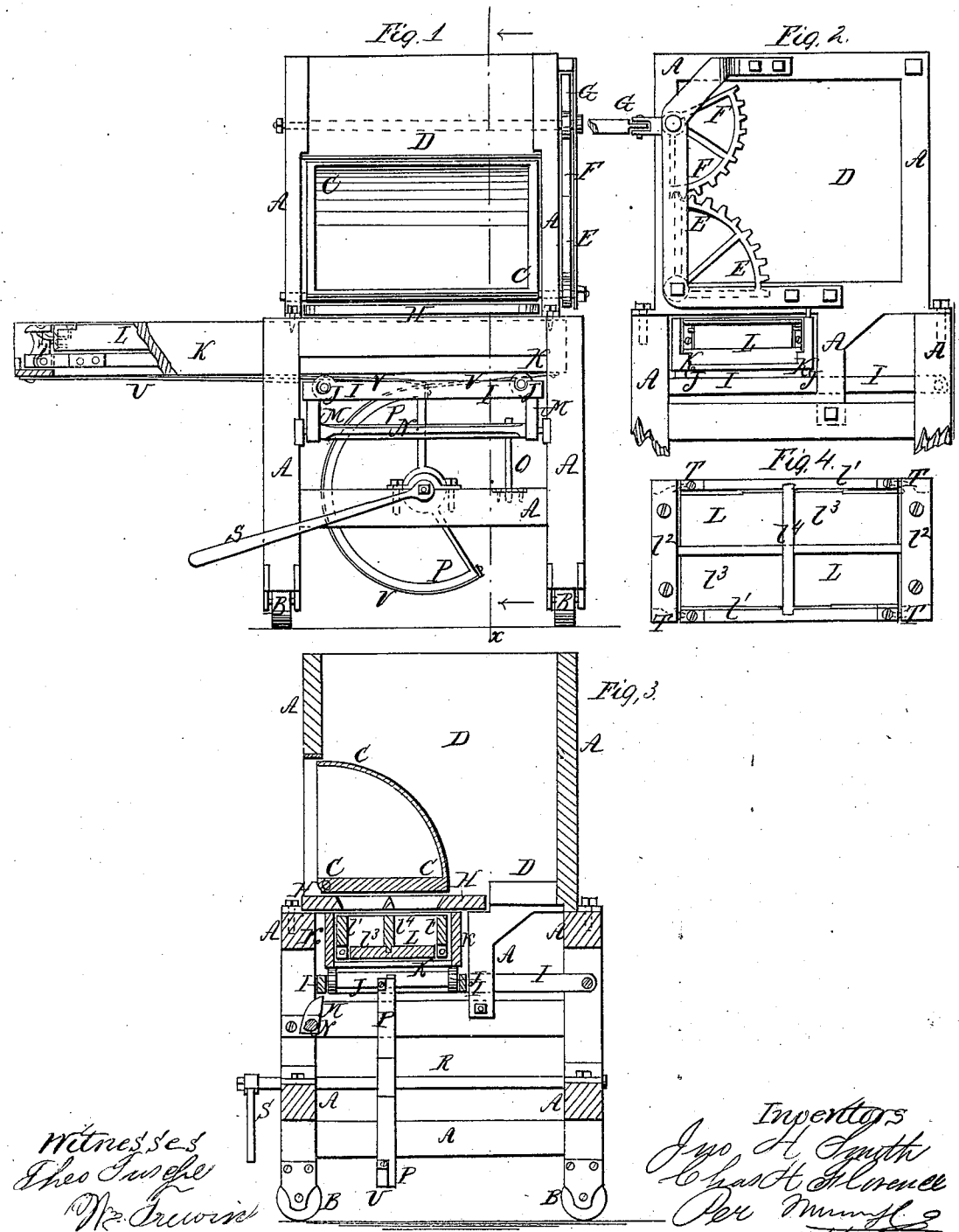

JOHN H. SMITH AND CHARLES H. FLORENCE, OF RICHVIEW, ILLINOIS, ASSIGNORS TO THEMSELVES, F. P. SEAWELL, AND H. G. W. WHITTENBURG.

Letters Patent No. 77,118, dated April 21, 1868.

IMPROVED BRICK-MACHINE.

The Schedule referred to in these Letters Patent and making part of the same.

TO ALL WHOM IT MAY CONCERN:

Be it known that we, JOHN H. SMITH and CHARLES H. FLORENCE, of Richview, in the county of Washington, and State of Illinois, have invented a new and useful Improvement in Brick-Machines; and we do hereby declare that the following is a full, clear, and exact description thereof, which will enable others skilled in the art to make and use the same, reference being had to the accompanying drawings, forming part of this specification, in which—

Figure 1 is a front view of our improved machine.
Figure 2 is a side view of the upper part of the same.
Figure 3 is a vertical section of the same, taken through the line $x\ x$, fig. 1.
Figure 4 is a top view of the brick-mould.

Similar letters of reference indicate corresponding parts.

Our invention has for its object to furnish an improved machine for moulding brick, which shall be simple in construction, easily operated, and conveniently moved from one part of the yard to another; and it consists in the construction and combination of the various parts of the machine, as hereinafter more fully described and set forth.

A is the frame of the machine, to the lower ends of the posts of which are attached wheels B, so that the machine may be easily moved from one part of the yard to another, to shorten the run of the off bearers.

C is the presser, which is made in the form of a quarter of a cylinder, as shown in fig. 3, and which is pivoted at its angles to the frame A, as shown in figs. 1 and 3.

A part of the front side of the receiving-box D is cut away, so that, when the presser C is raised, it may pass out of the said box, leaving a free passage for the prepared clay to the moulds.

E is the segment of a cog-wheel, which is attached to the projecting end of one of the journals of the presser C, and into the teeth of which mesh the teeth of the segmental cog-wheel F, which is pivoted to the upper part of the frame A, and to which is rigidly connected the lever G, by which the presser C is raised and lowered.

The front part of the bottom of the receiving-box D is cut away, and in the opening thus formed is secured a frame, H, having hopper-shaped openings through it, through which the prepared clay passes into the moulds, the lower ends of said openings being the exact form and size of a brick.

I is a frame, the rear end of which is pivoted to the rear part of the frame A, at a little distance below the receiving-box D, and to the front and middle cross-bars of which, as shown in figs. 1 and 3, are pivoted two or more rollers J, upon which the frame K, that contains the brick-moulds L, moves back and forth.

The forward end of the frame I rests upon the cams M, which are rigidly attached to the shaft N, which works in bearings in the frame A.

The cams M and shaft N are operated by a lever, O, which passes through a hole in the shaft N, and the free end of which enters a hole in a cross-bar of the frame A, to lock the said shaft, when holding the frame I in proper position for operating the machine.

The frame K, which slides back and forth upon the rollers J, or upon wheels formed upon or attached to said rollers, is made large enough to contain two or more moulds L, the size and number of the moulds depending upon the size and capacity of the machine; but it is generally most convenient to use two moulds, one at each end of the frame K, and of such a size as to be conveniently handled when full.

The moulds L may be made in the ordinary manner, but we prefer to make them as shown in figs. 1, 2, 3, 4; that is to say, the sides $l^1$ and ends $l^2$ are hinged or pivoted to the bottom, $l^3$, or to metallic ears attached to the said parts, and the partitions $l^4$ are rigidly attached to the bottom, $l^3$. The ends $l^2$ have inclined prongs T attached to them, which enter holes in the ends of the sides $l^1$.

By this construction, when the full mould is reversed and supported by the ends, the weight of the moulded brick and of the mould moves the said ends upon their hinges or pivoting-points, a little away from the bricks, and at the same time the inclined prongs M move the sides $l^1$ upon their pivoting-points, a little away from the bricks, so that the said bricks may be easily and quickly discharged from the mould.

P is a segment of a wheel, which is attached to the shaft R, which revolves in bearings in the frame A, and to the forward end of which is attached a lever, S, by which the said wheel P may be operated.

To the ends of the segment P are attached the ends of two flexible straps or chains U, the other ends of which are attached to the ends of the frame K, as shown in fig. 1, so that, by operating the lever S, the frame K and moulds L may be moved back and forth beneath the receiving-box D.

In using the machine, the prepared clay is wheeled up a staging attached to the rear side of the machine, and dumped into the receiving-box D. When the presser C is raised, the clay passes through the slotted frame H into the mould L. As the presser C is moved down into the position shown in figs. 1 and 3, the clay is forced into said mould, forming the bricks. The lever S is then operated to move the full mould out of the machine, and the empty mould, in the other end of the frame K, in to be filled. The full mould is then removed, and the brick discharged in the manner hereinbefore described, an empty mould being put into its place.

We claim as new, and desire to secure by Letters Patent—

1. The combination of the pivoted frame I, bearing the rollers J, mould-holder K, hopper-plate H, inclined pawls M upon shaft N, the segment P, and straps U, all arranged and operating as described, for the purpose specified.

2. The mould L, the sides $l^1$ and ends $l^2$ of which are connected to the bottom, $l^3$, and to each other by inclined prongs T, arranged substantially in the manner herein shown and described, and for the purpose set forth.

JOHN H. SMITH,
CHARLES H. FLORENCE.

Witnesses:
 WLLSON B. RILEY,
 HENRY W. HOUSE.